(12) United States Patent
Benner et al.

(10) Patent No.: US 11,796,008 B2
(45) Date of Patent: Oct. 24, 2023

(54) CONSTANT VELOCITY JOINT

(71) Applicant: GKN Driveline International GmbH, Lohmar (DE)

(72) Inventors: Ida Benner, Troisdorf (DE); Rolf Cremerius, St. Augustin (DE); Anna Gremmelmaier, Sankt Augustin (DE); Wolfgang Hildebrandt, Siegburg (DE); Stephan Maucher, Siegburg (DE); Hans-Jürgen Post, Bonn (DE); Thomas Weckerling, Sankt Augustin (DE)

(73) Assignee: GKN Driveline International GmbH, Lohmar (DE)

(*) Notice: Subject to any disclaimer, the term of this patent is extended or adjusted under 35 U.S.C. 154(b) by 380 days.

(21) Appl. No.: 17/257,593

(22) PCT Filed: Jul. 5, 2018

(86) PCT No.: PCT/EP2018/068265
§ 371 (c)(1),
(2) Date: Jan. 4, 2021

(87) PCT Pub. No.: WO2020/007476
PCT Pub. Date: Jan. 9, 2020

(65) Prior Publication Data
US 2021/0140488 A1    May 13, 2021

(51) Int. Cl.
*F16D 3/223*    (2011.01)
*F16D 3/2237*   (2011.01)

(52) U.S. Cl.
CPC .. *F16D 3/2237* (2013.01); *F16D 2003/22303* (2013.01); *F16D 2003/22309* (2013.01); *Y10S 464/906* (2013.01)

(58) Field of Classification Search
CPC ......... F16D 3/2237; F16D 2003/22303; F16D 2003/22309; Y10S 464/906
(Continued)

(56) References Cited

U.S. PATENT DOCUMENTS 8,162,764 B2 * 4/2012 Ishijima ................... F16D 3/223
464/145
8,162,766 B2 * 4/2012 Kura ...................... F16D 3/2245
464/145
8,267,802 B2 9/2012 Kobayashi et al.

FOREIGN PATENT DOCUMENTS

DE    102012102678 A1   10/2013
EP       0802341 A1     10/1997
(Continued)

OTHER PUBLICATIONS

International Search Report and Written Opinion for PCT/EP2018/068265 dated Nov. 26, 2018 (11 pages; with English translation).

*Primary Examiner* — Greg Binda
(74) *Attorney, Agent, or Firm* — Bejin Bieneman PLC (57) ABSTRACT

A constant velocity joint comprises an outer joint part with outer ball tracks, an inner joint part with inner ball tracks, wherein respectively an outer ball track and an inner ball track form a pair of tracks with each other; a torque-transmitting ball in each pair of tracks; a ball cage in which the torque-transmitting balls are received; wherein a first articulation angle range is defined comprising articulation angles of less than twenty degrees, and a second articulation angle range comprising articulation angles greater than twenty degrees; wherein an opening angle within the first articulation angle range increases as the articulation angle ($\beta$) increases, and wherein a first mean opening angle increase of the first articulation angle range is greater than a second mean opening angle increase of the second articulation angle range.

14 Claims, 5 Drawing Sheets

(58) Field of Classification Search
USPC .................................................. 464/15, 145
See application file for complete search history.

(56) References Cited

FOREIGN PATENT DOCUMENTS

EP           2778454 A1   9/2014
WO    2014154838 A1  10/2014

* cited by examiner

CONSTANT VELOCITY JOINT

CROSS-REFERENCE TO RELATED APPLICATIONS

This application is a national stage of, and claims priority to, Patent Cooperation Treaty Application No. PCT/EP2018/068265, filed on Jul. 5, 2018, which application is hereby incorporated herein by reference in its entirety.

BACKGROUND

Constant velocity joints allow torque transmission between the outer joint part and inner joint part under angular motion. Basically, a distinction is made between constant velocity joints in the form of fixed joints and plunging joints. In fixed constant velocity joints, there is substantially only angular movement provided between the outer joint part and inner joint part, i.e. apart from usual tolerances, there is no axial movements. In contrast thereto, constant velocity plunging joints allow not only angular movements but also axial movements between the outer joint part and inner joint part.

A constant velocity joint in the form of a fixed type joint is known from DE 10 2012 102 678 A1. In any angular position of the constant velocity joint, an opening angle is enclosed between an outer tangent and an inner tangent to a ball. The pairs of tracks are configured such that for at least one joint articulation angle within a small articulation angle range, an opening angle is zero, and within a larger articulation angle range, an opening-sided opening angle of a ball moving to the opening side of the outer joint part and an attachment-sided opening angle of a ball moving to the attachment side of the outer joint part at the same joint articulation angle are unequal to zero and open in the same axial direction.

A constant velocity joint in the form of a fixed joint with eight torque-transmitting balls is known from EP 0 802 341 A1. The pairs of tracks, each consisting of an outer ball track and an inner ball track, open to the opening side of the joint. In one embodiment, the ball tracks have a uniform radius over the length. In another embodiment, the ball tracks are composed of a radius and an adjoining straight line; such constant velocity joints are also known as undercut-free joints (UF joints).

From U.S. Pat. No. 8,267,802 B2, a fixed-type constant velocity joint is known in which the centers of the outer and inner ball tracks are offset from a spherical face center point. The ratio of an axial offset (F) relative to the pitch circle radius (PCR) is between 0.045 and 0.065. A fixed-type constant velocity joint is also known with a curved track portion and a straight track portion, which merge into each other in the joint center plane. A fixed-type constant velocity joint with a uniformly curved track portion over the entire track length is also known.

When designing constant velocity joints, there are various, sometimes contradictory requirements to be met. An important goal is to minimize the reaction forces of the joint components interacting during operation in order to minimize power losses and maximize the efficiency of the joint. At the same time, the constant velocity joint should work reliably and as wear-free as possible in all angular positions occurring during operation.

Depending on the configuration of the track curvature, this results in a larger or smaller opening angle of the constant velocity joint. A track with a small curvature and/or small radius of curvature in the inner joint part leads to the balls exiting the ball track at larger articulation angles. A track with a large curvature and/or large radius of curvature in the inner joint part leads to a relatively small increase of the opening angle upon articulation of the joint, which can be disadvantageous for controlling the ball cage.

SUMMARY

The present disclosure relates to a constant velocity joint for torque transmission, comprising an outer joint part with outer ball tracks, an inner joint part with inner ball tracks, torque transmitting balls guided in pairs of outer and inner ball tracks, and a ball cage which receives the balls in circumferentially distributed windows and holds them in a common plane. Thus described is a constant velocity joint which enables reliable cage control even at small articulation angles and which has a sufficient torque transmission capacity at the inner joint part at larger articulation angles.

Accordingly, a constant velocity joint comprises an outer joint part with a longitudinal axis and outer ball tracks, the outer joint part having an attachment side and an opening side; an inner joint part with a longitudinal axis and inner ball tracks. An outer ball track and an inner ball track form a pair of tracks with each other. A torque-transmitting ball is provided in each pair of tracks. A ball cage is arranged between the outer joint part and the inner joint part and comprises circumferentially distributed cage windows, each receiving at least one of the torque-transmitting balls. The balls by the ball cage define a joint center plane (EM) when the longitudinal axes of the inner joint part and the outer joint part are coaxially aligned the two longitudinal axes (L12, L13) define a joint articulation plane (EB) at articulation angles ($\beta$) other than zero degrees. When viewed in the joint articulation plane (EB), an opening angle ($\delta$) is formed in any angular position of the constant velocity joint between an outer tangent (T) applied to the outer ball track at an outer contact point between the outer ball track and the ball and an inner tangent (T') applied to the inner ball track at an inner contact point between the inner ball track and the ball. The centers of the balls when moving along the outer and inner ball tracks each define a center point line (A, A'), Furthermore, a first articulation angle range comprising articulation angles ($\beta$) of less than twenty degrees ($-20°<\beta<20°$); and wherein a second articulation angle range is defined comprising articulation angles ($\beta$) of greater than twenty degrees ($\beta>\pm20°$); wherein at least some of the pairs of tracks are configured such that the attachment-sided opening angle ($\delta$) at a ball moving in the joint articulation plane (EB) towards the attachment side of the outer joint part increases within the first articulation angle range as the articulation angle ($\beta$) increases, and an attachment-sided first mean opening angle increase (S1) of the attachment-sided opening angle ($\delta$) over the articulation angle ($\beta$) within the first articulation angle range is greater than an attachment-sided second mean opening angle increase (S2) of the opening angle ($\delta$) over the articulation angle ($\beta$) within the second articulation angle range.

An advantage of the constant velocity joint is that due to the increasing opening angle within the central articulation angle range of up to twenty degrees around the joint center plane, a reliable cage control of the ball cage is ensured, in particular also by the balls moving from the center plane to the attachment side. A relatively large track radius in the central articulation angle range leads to a slight increase in the opening angle over the articulation angle. However, because the increase of the opening angle decreases again at larger articulation angles of more than twenty degrees and is in particular smaller than in the central articulation angle range, the balls remain reliably guided in the inner joint part even at these large articulation angles and exit only slightly axially from the ball tracks of the inner joint part.

The opening angles are defined between an outer tangent to the outer ball track and an inner tangent to the inner ball track, both in the contact area with the ball guided in the outer and inner ball track. The opening angle refers to the joint articulation plane, which is spanned by the longitudinal axes of the outer and inner joint part, respectively, to a pair of tracks lying in the joint articulation plane with a ball received therein. The contact area between the ball and the ball track can be directly in the joint articulation plane, for example in the case of a circular track cross section whose cross-sectional radius corresponds to the radius of the ball, or in planes offset parallel to the joint articulation plane, which are spanned by the ball contact lines between the ball and the ball tracks, for example in the case of a cross-section of the ball tracks deviating from the circular shape. In the latter case, the projections of the tangents applied to the respective ball track are considered in the joint articulation plane, which include the opening angle.

Of the constant velocity joint, at least some of the pairs of tracks, each comprising an outer and an inner ball track, have the shape with lower rates of increase of the opening angle at larger articulation angles. The number of balls and/or pairs of tracks of the constant velocity joint can be selected at will according to the technical requirements of the joint and can be, for example, six, seven or eight. In the context of the present disclosure when there is reference to a or at least some of the pairs of tracks, the respectively described feature can refer accordingly to two, more than two, the largest part or all pairs of tracks of the joint.

The rate of increase S of the opening angle, also referred to as the opening angle increase or opening angle rate, refers to the change in the opening angle over the angulation of the joint ($S=\Delta\delta/\Delta\beta$). It is provided that the mean opening angle rate $S1$ of the central first track section for the ball running from the joint center plane towards the attachment side is greater than the mean opening angle rate $S2$ of the adjoining second track section. According to an embodiment, the at least one pair of tracks in the attachment-sided section of the outer joint part, respectively in the associated opening-sided section of the inner joint part, can be configured such that the attachment-sided first mean opening angle rate ($S1$) is greater than 0.5. Alternatively or additionally, the track shape can be configured such that the attachment-sided second mean opening angle increase ($S2$) is less than 0.5. The first opening angle increase ($S1$) of the opening angle ($\delta$) over the articulation angle ($\beta$) within the first articulation angle range can be constant or variable. Alternatively or in addition, the at least some pairs of tracks can be configured such that the second opening angle increase ($S2$) of the opening angle ($\delta$) over the articulation angle ($\beta$) is variable within the second articulation angle range. However, it is also possible that the opening angle increase ($S2$) of the second articulation angle range is constant. In particular, it is provided that at least one opening angle ($\delta$) within the second articulation angle range is larger than a maximum opening angle of the central articulation angle range.

The at least one pair of tracks can be designed such that, when the joint is aligned ($\beta=0°$), the opening angle ($\delta$) is greater than or equal to zero degrees ($\delta\geq0°$) and/or less than eight degrees ($\delta<8°$), in particular less than 4 degrees ($\delta<4°$), e.g., less than 2 degrees ($\delta<2°$). Due to a relatively small opening angle in the aligned condition of the joint, the axial forces effective between the ball tracks and the balls along the ball tracks are low. Overall, therefore, only small reaction forces occur between the contacting joint parts, so that friction losses are accordingly low. Starting from the aligned position of the joint, respectively of the joint center plane, the opening angle substantially increases with increasing angulation of the joint in the first articulation angle range ($\beta=0°\pm20°$). The at least one pair of tracks can be configured such that the opening angle ($\delta$) increases by at least five degrees within the first articulation angle range, in particular at least ten degrees. The central first articulation angle range is followed by the second articulation angle range. The second articulation angle range includes articulation angles ($\beta$) that are greater than 20° with respect to the absolute value, i.e. that are smaller than minus 20° or greater than plus 20° ($\beta>\pm20°$). The second articulation angle range can include articulation angles of up to 40°, for example, and in particular up to 50°, in particular up to the maximum articulation angle, without being restricted thereto.

With the joint being aligned, the centers of the torque-transmitting balls lie in the joint center plane and/or define same. The diameter on which the centers of the balls lie when the joint is aligned is referred to as pitch circle diameter (PCD). Accordingly, the pitch circle radius (PCR) defines the radius around the center of the joint on which the centers of the balls lie when the joint is aligned.

When the constant velocity joint rotates under articulation, the torque-transmitting balls move along the ball tracks. Thereby, viewed in the joint articulation plane, the ball moving to the opening side of the outer joint part is guided into an opening-sided section of the outer joint part and into an attachment-sided section of the inner joint part. The ball moving to the attachment side of the outer joint part, viewed in the joint articulation plane, is guided into an attachment-sided track section of the outer joint part and into an opening-sided track section of the inner joint part.

The ball tracks of the outer joint part have, along their length, with respect to the joint center plane a track section on the opening side and a track section on the attachment side. The track section of the inner joint part that extends, starting from the joint center plane, on the opening side corresponds substantially to the attachment-sided track section of the outer joint part. This means that the opening-sided track section of the inner joint part is configured such that the associated center track of this track section is mirror-symmetrical to the center track of the attachment-sided track section of the outer joint part with respect to a bisecting plane. This applies to each of the track pairs.

According to an embodiment, the at least some pairs of tracks in the central articulation angle range can be configured such that for each articulation angle ($\beta$) within the first articulation angle range it applies that an opening-sided opening angle ($\delta o$) of a ball moving in the joint articulation plane (EB) towards the opening side of the outer joint part and an attachment-sided opening angle ($\delta a$) of a ball moving at the same articulation angle ($\beta$) in the joint articulation plane (EB) towards the attachment side of the outer joint part, open in the same axial direction. By opening angles facing in the same axial direction, it is meant that the resulting force acting from the outer and inner ball tracks on a ball moving in the joint articulation plane towards the attachment side has an axial force component pointing in the same axial direction as the resulting axial force component acting on a ball moving towards the opening side. This configuration ensures that the ball cage is at least approximately controlled to the angle bisecting plane. If present, the other pairs of tracks also comprise mouth openings, which can point in the same axial direction as the mouth openings of the pairs of tracks. Preferably, all pairs of tracks are designed such that the opening angles δ at all balls open in the same axial direction when the joint is articulated, respectively seen in the joint articulation plane. This can also apply to the second articulation angle range following the central articulation angle range. Furthermore, it is preferable for a convenient manufacturing process that all outer ball tracks are designed the same, and that all inner ball tracks are designed the same.

The centers of the balls define a center point line (A, A') when moving along the outer and inner ball tracks, viewed in the joint articulation plane. According to an embodiment, the center point line (A, A') has at least two track sections with different curvature over its length. The at least two track sections with different curvature can lie within the opening-sided section and/or within the attachment-sided section and/or partially within the opening-sided and attachment-sided section of the outer and inner ball tracks.

According to a configuration, the attachment-sided track sections of the ball tracks of the outer joint part—and accordingly also the opening-sided track sections of the inner joint part—each have at least two partial sections with different curvature, which can also be called segments.

A first segment of the attachment-sided track sections of the outer joint part can have a first radius of curvature (Ra1), which is configured in particular such that the ratio of the pitch circle radius (PCR) to the first radius of curvature (Ra1) of the attachment-sided track section is greater than 1.4. The first radius of curvature of the first segment can, for example, be formed by a first circular arc section around a first segment center (Ma1), wherein the first segment center (Ma1) has a radial offset from the longitudinal axis in the direction towards the ball track. The first circular arc section can extend over a first track segment angle (γ1) of 14° to 22° (14° <γ1 <22° around the first segment center (Ma1). The first segment center point (Ma1) can be located in the joint center plane (EM) or axially offset therefrom.

A second partial segment of the attachment-sided track sections of the outer joint part can have a second radius of curvature (Ra2), which is configured in particular such that the ratio of the pitch circle radius (PCR) to the second radius of curvature (Ra2) of the attachment-sided track section (22a) is less than 1.4. The second radius of curvature (Ra2) of the second segment can be formed by a second circular arc section around a second segment center (M2a), wherein the second segment center (M2a) has in particular an axial offset from the joint center plane in the direction of the opening side. The second circular arc section can extend over a second track segment angle of 12° to 20° (12° <γ2<20°) around the second segment center (Ma2). As already mentioned above, the ball tracks of the inner joint part are correspondingly designed in the opposite direction.

According to a configuration, the ball cage has a spherical outer face for guiding the ball cage with respect to an inner face of the outer joint part, and a spherical inner face for guiding the ball cage with respect to an outer face of the inner joint part. An axial offset may be provided between a center of the spherical outer face and a center of the spherical inner face. This measure ensures good cage control during angular movement of the constant velocity joint. However, it is also possible that the centers of the spherical inner face and outer face lie in one plane. A radial clearance can be provided between the outer spherical outer face of the ball cage and the inner spherical face of the outer joint part and/or between the inner spherical face of the ball cage and the outer spherical face of the inner joint part.

According to a configuration, a lubricant is provided for lubricating the constant velocity joint, which has a coefficient of friction (μ) between 0.02 and 0.09 (0.02<μ<0.09), in particular between 0.05 and 0.06 (0.05<μ<0.06).

Furthermore, according to a possible configuration at least one of the following can apply to the at least some pairs of tracks: the ratio between pitch circle radius (PCR) and ball diameter (DB) is between 1.4 and 2.1; the ratio between pitch circle radius (PCR) and axial offset of the ball cage is between 5.0 and 12.5; the ratio between pitch circle radius (PCR) and axial offset of the second track segment center (Ma2) is between 4.0 and 8.0; the ratio between pitch circle radius (PCR) and diameter of a connecting profile of the inner joint part is between 1.0 and 1.25; and/or the ratio between pitch circle radius (PCR) and outer diameter of the outer joint part is between 0.315 and 0.345. If the joint is designed according to one or more of these ratios, a particularly compact design is achieved.

Usually, clearance is provided between the parts of the constant velocity joint that move relative to each other. For example, the joint can have one or more of the following dimensions without being restricted thereto: the radial clearance between the cage and the ball hub (ORC) can be, for example, between 0.01 mm and 0.08 mm; the radial clearance between the cage and the outer joint part (IRC) can be, for example, between 0.01 mm and 0.08 mm; the radial clearance between the balls and the respective ball track (SKR) can be, for example, between 0 mm and 0.05 mm; and/or the clearance between ball and cage window (SKF) of the ball cage can be, for example, between-0.03 mm and 0.03 mm.

When the constant velocity joint is installed, a boot can be provided to seal the joint chamber. The boot can be mounted with preload so that an axial force is generated by the boot, which loads the inner joint part and outer joint part away from each other. In the pretensioned state, the boot generates an axial force component that presses out any play present between said components. A sudden change in load, e.g. from a torque-free state to a high torque, does not cause the cage to strike against the inner part, respectively outer part, so that unwanted noises are avoided. The preload force can be in the range of 30 N to 150 N, for example.

In the context of the present disclosure, the track angle β/2 is understood to be the angle that a radius around the joint center M to the ball center of one of the torque-transmitting balls encloses with the joint center plane EM. The track angle β/2 in any angular position of the joint is usually half of the joint articulation angle β, i.e. the track angle β/2 of up to 10°, for example, corresponds to a joint articulation angle of 20°.

Due to the guidance of the ball cage relative to the spherical inner face of the outer joint part and/or the spherical outer face of the inner joint part, the constant velocity joint is configured in the form of a fixed joint, which only permits displacement movements within the limits of the axial clearance between the outer joint part and inner joint part. However, it is also conceivable that the cage could be axially cleared with respect to the inner face of the outer joint part and the outer face of the inner joint part, so that the joint would then be designed as a plunging joint.

BRIEF SUMMARY OF THE DRAWINGS

Examples are explained below using the drawing figures, which show:

FIG. 1F) the outer joint part from FIG. 1A) in longitudinal section with further details drawn in;

FIG. 1G) the inner joint part from FIG. 1A) in longitudinal section with further details drawn in;

DESCRIPTION

Figure 1A:
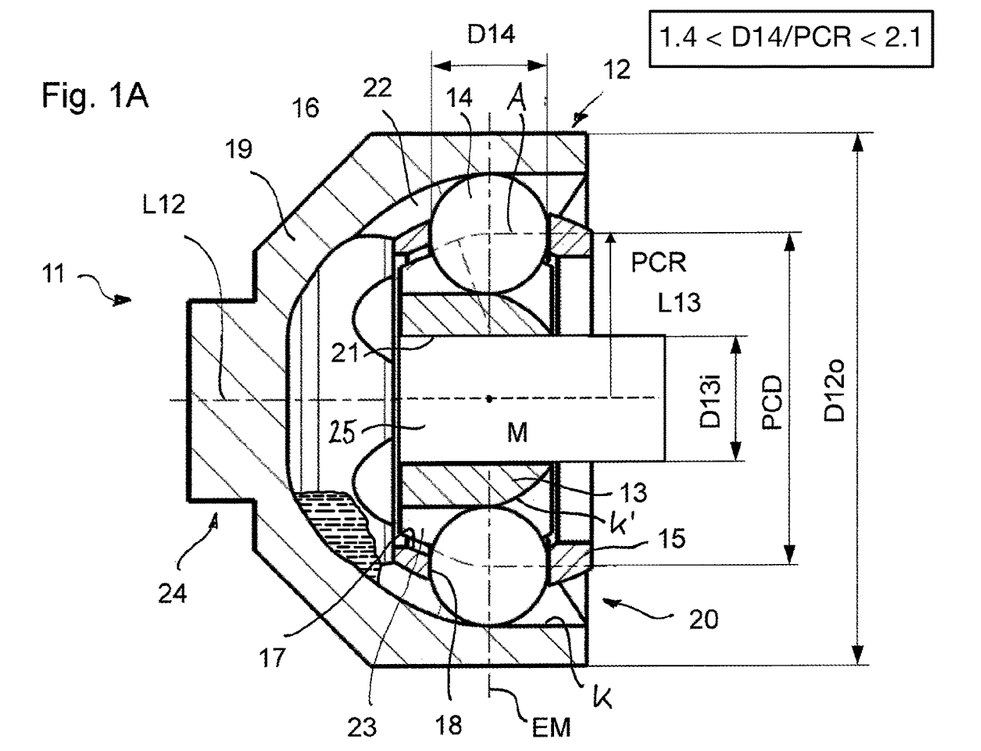
FIG. 1A) a constant-velocity joint according in an aligned position in longitudinal section.
Figure 1B:
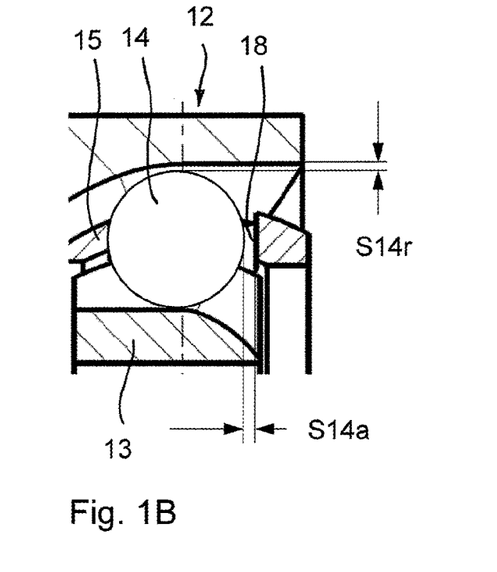
FIG. 1B) a detail of the joint from FIG. 1A) in an enlarged view.
Figure 1C:
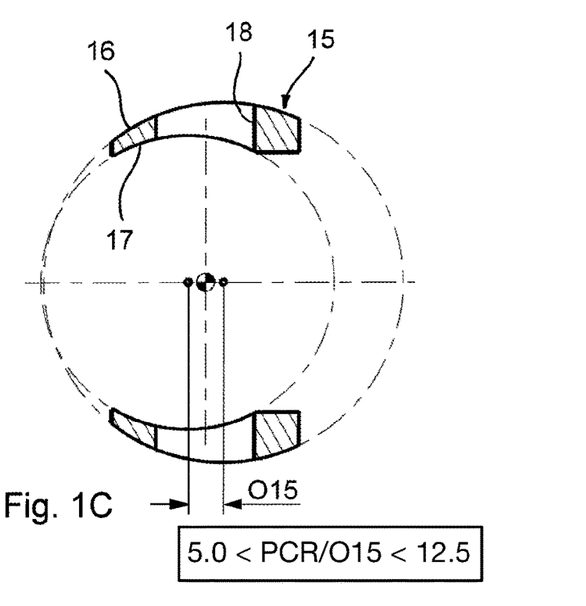
FIG. 1C) the ball cage of the joint from FIG. 1A) as a detail.
Figure 2A:
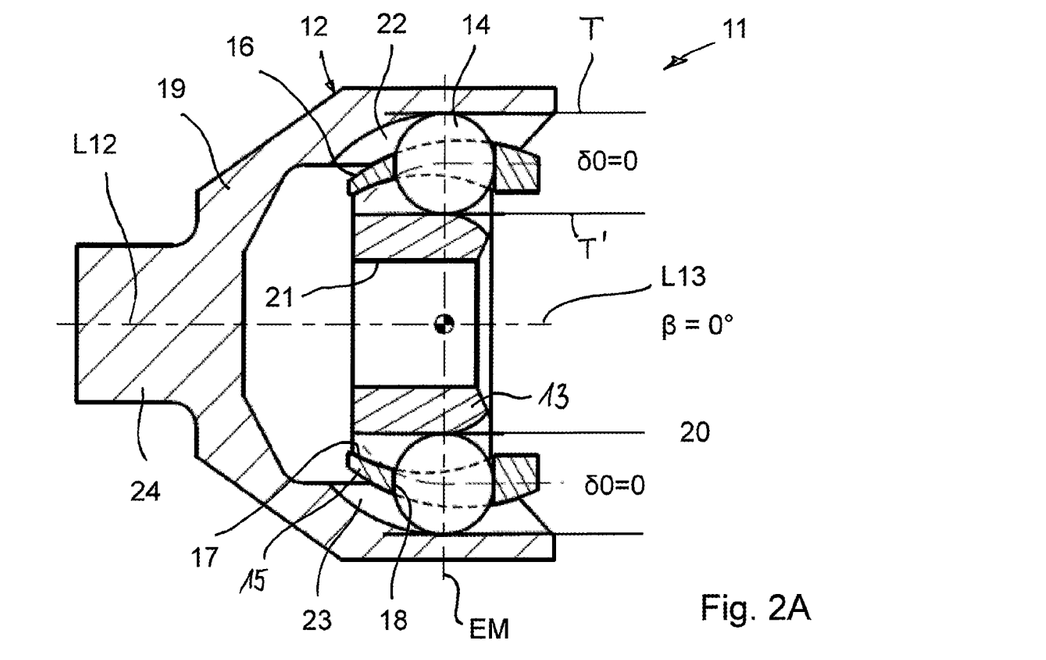
FIG. 2A) the joint from FIG. 1A) in aligned position, i.e. with an articulation angle of 0°.
Figure 2B:
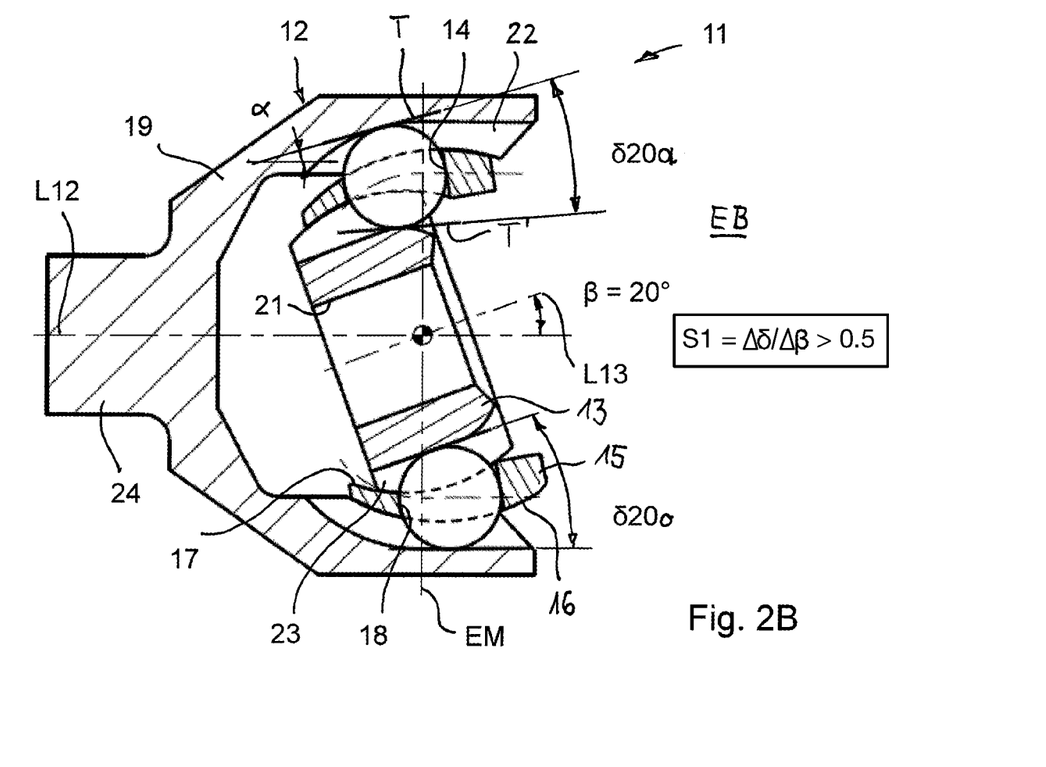
FIG. 2B) the joint from FIG. 1A) articulated by an articulation angle of 20°.
Figure 2C:
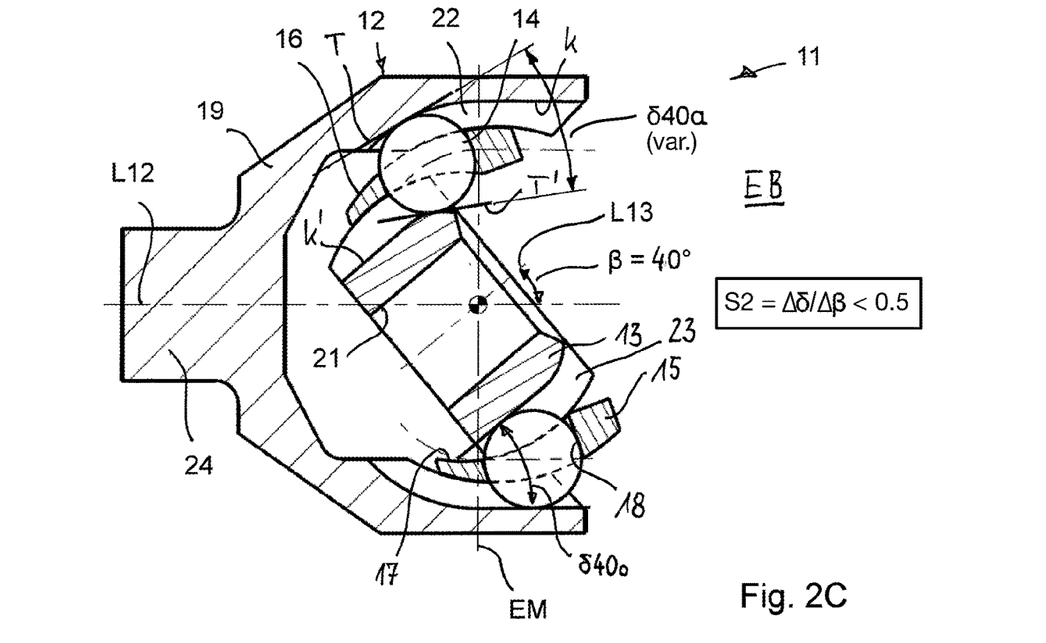
FIG. 2C) the joint from FIG. 1A) articulated by an articulation angle of 40°.
Figure 3:
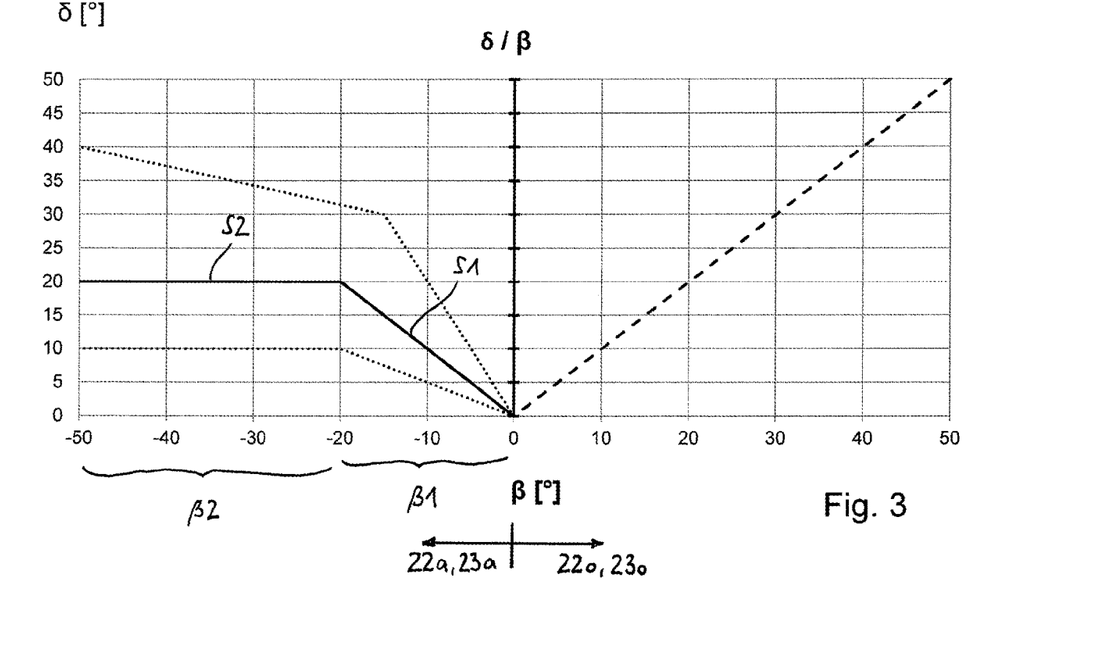
FIG. 3) a diagram showing the opening angle δ (in angular degrees) over the articulation angle β (in angular degrees).

FIGS. 1A) to 1G), FIGS. 2A) to 2C) and FIG. 3 are described together below. A constant velocity joint 11 is shown. The constant velocity joint 11 comprises an outer joint part 12, an inner joint part 13, torque transmitting balls 14, and a ball cage 15. The ball cage 15 has a spherical outer face 16 guided in the outer joint part 12 and a spherical inner face 17 guided on the inner joint part 13. The balls 14 are held in circumferentially distributed cage windows 18 in the ball cage 15 in the joint center plane EM. A longitudinal axis L12 is indicated at the outer joint part 12 and a longitudinal axis L13 at the inner joint part 13. The intersection of the longitudinal axes L12, L13 with the joint center plane EM forms the joint center M.

The outer joint part 12 has a base 19, to which a connecting journal 24 is connected, and an opening 20. The inner joint part 13 has an opening 21, into which the journal of a drive shaft 25 is inserted in a rotationally fixed manner to transmit a torque. In the present disclosure, the position of the base 19 designates the axial direction "to the attachment side", the position of the opening 20 designates the axial direction "to the opening side". These terms are also used with respect to the inner joint part 13, wherein the actual connection of the shaft 25 to the inner joint part 13 is not taken into account. It is understood that the outer joint part, instead of the base, can also be designed open to the attachment side, as is the case with a disc joint, for example.

In the outer joint part 12 there are outer ball tracks 22 and in the inner joint part 13 there are inner ball tracks 23 of the constant velocity joint 11. Respectively an outer ball track 22 and an inner ball track 23 are located opposite each other and jointly form a pair of tracks with each other, in which respectively a torque-transmitting ball 14 is guided. The opposing outer and inner ball tracks 22, 23 can lie in radial planes around the respective longitudinal axis L12, L13. The radial planes have the same angular distance from each other. However, it is also conceivable that two pairs of tracks adjacent to each other in the circumferential direction run in parallel planes which are parallel to the longitudinal axis L12, L13. This configuration is also known as "twin-ball" joint. When the joint is articulated, i.e. upon angular movement of the inner joint part 13 relative to the outer joint part 12, the balls 14 are guided out of the joint center plane EM at least approximately into the angle bisecting plane between the longitudinal axis L12 of the outer joint part 12 and the longitudinal axis L13 of the inner joint part 13. By at least approximately it is meant that the plane defined by the ball centers of the balls 14 lies within an angular range of ±10% around the angle bisecting plane, and may in particular correspond thereto.

Figures 1D, 1E:
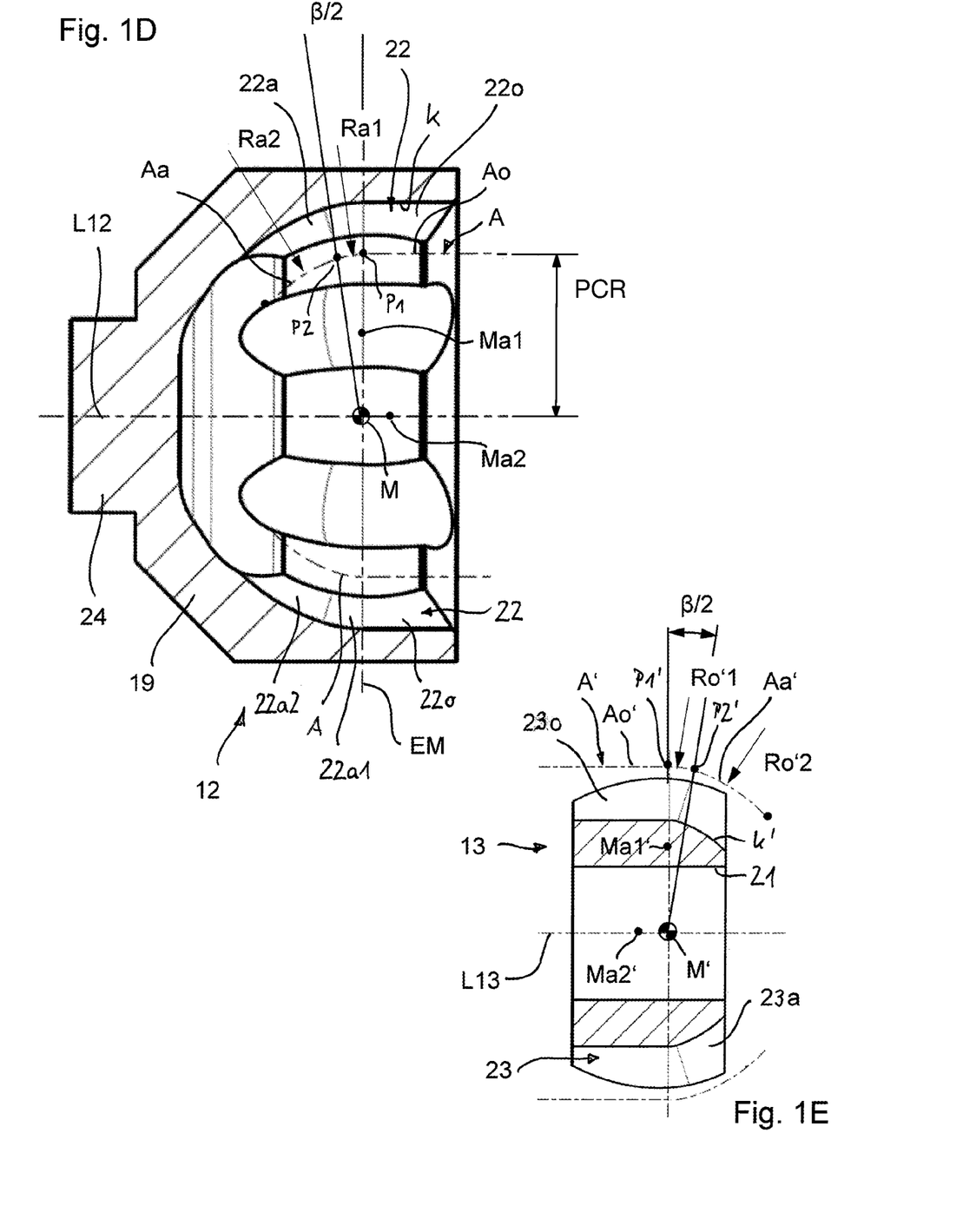
FIG. 1D) the outer joint part from FIG. 1A) in longitudinal section.
FIG. 1E) the inner joint part from FIG. 1A) in longitudinal section.
Figures 1F, 1G:
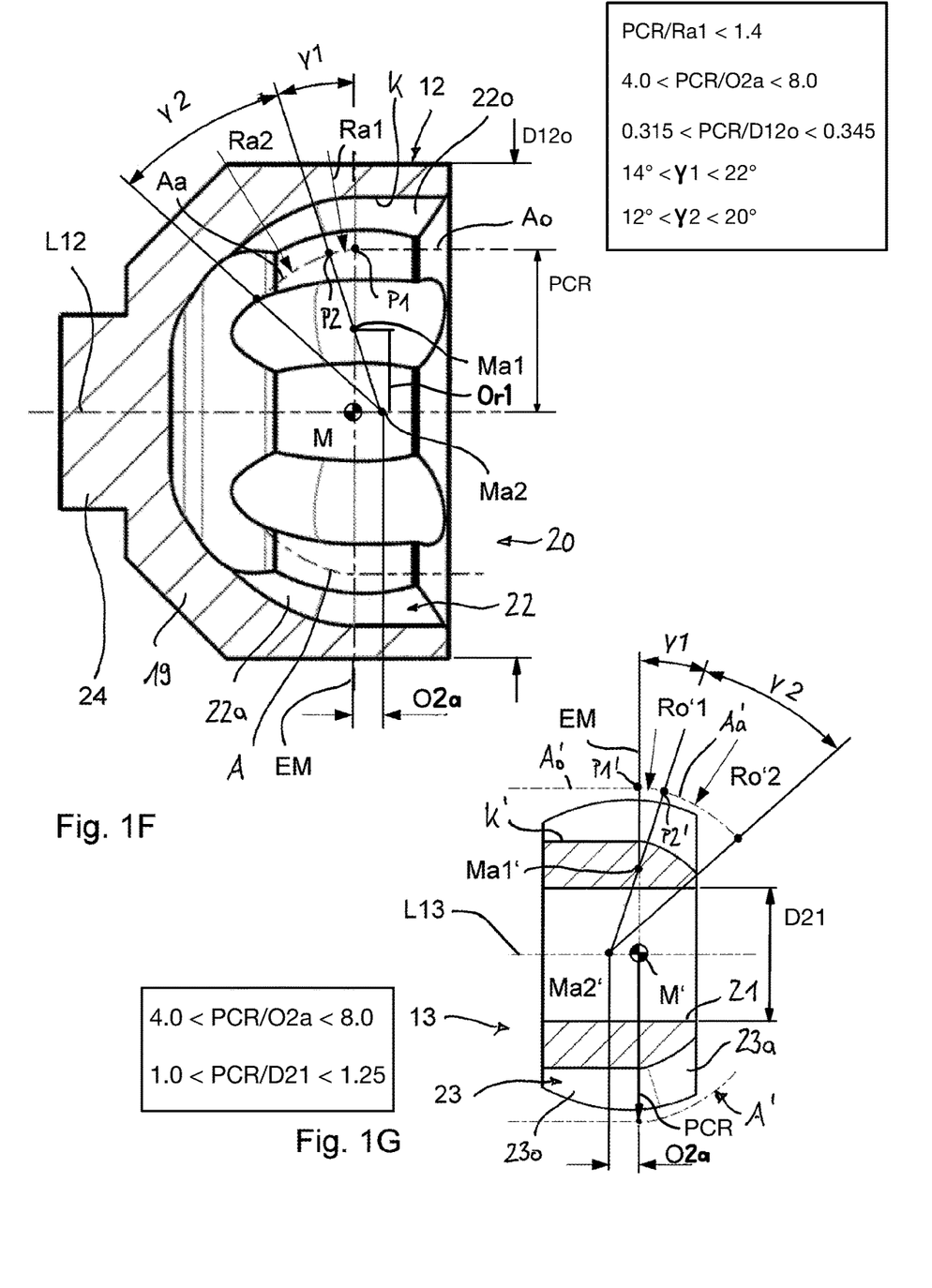

The shape of the outer ball tracks 22, which at least largely corresponds to the shape of the inner ball tracks, can be seen in particular in FIGS. 1D and 1G. The balls 14 are in contact with the outer ball tracks 22 in the outer joint part 12 and the inner ball tracks 23 in the inner joint part 13. The balls 14 form, in longitudinal section, an outer contact line K in the contact area with the outer ball tracks 22 and an inner contact line K' in the contact area with the inner ball tracks 23. The balls 14 are shown with contact in the track base of the ball tracks 22, 23, which however need not necessarily be given. Thus, the outer and inner contact lines K, K' can be located in the track base, as shown, i.e. in a radial plane containing the longitudinal axes L12, L13, or in planes parallel to the longitudinal axes. When moving along the outer and inner ball tracks 22, 23, the centers of the balls 14 each define a center point line A, A'. The center point lines A, A' run parallel to the respective contact line K, K'. To describe the ball tracks 22, 23, it can be either referred to the contact lines K, K' in the track base or to the center point lines A, A', which are defined by the sum of the ball centers during angular movements of the joint. The ball center line A is the line of the ball centers of the balls 14A along the outer ball tracks 22 in the outer joint part 12, and A' is the ball center line of the corresponding inner ball tracks 23 in the inner joint part 13.

In the present embodiment, an axial offset is provided between a center M16 of the spherical outer face 16 and a center M17 of the spherical inner face 17 of the ball cage 15. This ensures good cage control during angular movement of the constant velocity joint. A clearance is optionally provided between the spherical inner face 17 of the ball cage 15 and a spherical outer face of the inner joint part 13 as well as between the spherical outer face 16 of the ball cage 15 and a spherical inner face of the outer joint part 12. A radial clearance between the cage 15 and the inner joint part 13 and/or between the cage 15 and the outer joint part 12 can be between 0.01 mm and 0.08 mm, for example. A radial clearance S14r between the balls 14 and the respective ball track 22 can be between 0 mm and 0.05 mm, for example. An axial clearance S14a between ball 14 and cage window 18 of the ball cage 15 can be between −0.03 mm and 0.03 mm, for example.

To seal the joint against external influences, a sealing element such as a boot or diaphragm boot is usually provided. The joint chamber enclosed by the sealing element can be at least partially filled with a lubricant. The lubricant can, for example, have a coefficient of friction p between 0.02 and 0.09 (0.02<μ<0.09), in particular between 0.05 and 0.06 (0.05 <μ<0.06).

Furthermore, the constant velocity joint 11 can be designed such that one or more of the following features are fulfilled for at least some of the pairs of tracks 22, 23: the ratio between pitch circle radius PCR and ball diameter D14 is between 1.4 and 2.1; the ratio between pitch circle radius PCR and axial offset of the ball cage is between 5.0 and 12.5; the ratio between pitch circle radius PCR and axial offset of the second track segment center Ma2 is between 4.0 and 8.0; the ratio between pitch circle radius PCR and diameter of a connecting profile of the inner joint part is between 1.0 and 1.25; and/or the ratio between pitch circle radius PCR and outer diameter of the outer joint part is between 0.315 and 0.345.

In the following, it is enlarged upon the special features of the constant velocity joint, in particular the design of the ball tracks 22, 23. The following definitions apply in the context of the constant velocity joint and the design of the ball tracks, respectively:

The joint articulation angle β defines the angle enclosed between the longitudinal axis L12 of the outer joint part 12 and the longitudinal axis L13 of the inner joint part 13. The joint articulation angle β is zero when the joint is aligned.

The track angle β/2 defines the angle that a radius around the joint center M to the ball center encloses with the joint center plane EM. The track angle β/2 is always half of the joint articulation angle β in any angular position of the joint.

The opening angle δ defines the angle enclosed by tangents T, T' to the balls 14 in the contact points with the first ball tracks 22 and the second ball tracks 23, respectively. The systematic in the present disclosure is such that the opening angle, which can assume various values over the technically possible range of articulation angles, is generally designated δ; selected specific articulation angles can be supplemented with the respective articulation angle and an indication of the position of the ball (for example δ for the opening angle at a articulation angle of zero, or δ20o for the opening angle on the opening-sided ball at an articulation angle of 20°).

The rate of increase S of the opening angle δ is defined as the change of the opening angle δ over the articulation β of joint 11 (S=Δδ/Δβ).

The center plane EM is defined by the ball centers of the torque-transmitting balls 14 when the joint is aligned.

The diameter on which the centers of the balls 14 lie when the joint is aligned is called the pitch circle diameter PCD. Accordingly, the radius on which the centers of the balls 15 lie when the joint is aligned is called the pitch circle radius PCR.

FIG. 1D) shows the outer joint part 12 with its center point line A and contact line K, which are equidistant from each other.

The constant velocity joint 11 in the present embodiment comprises a number of six balls 14 and six pairs of tracks 22, 23, respectively, wherein it is understood that another number is conceivable. The center point line A of the outer joint part 12 has, starting from the opening side towards the attachment side, an opening-sided section Ao, which extends up to the joint center plane EM, and an attachment-sided section Aa, which continuously adjoins the opening-sided section Ao. Accordingly, the center point line A' of the inner joint part 13 has, starting from the opening side towards the attachment side, an opening-sided section Ao' and a continuously adjoining attachment-sided section Aa'.

The at least some pairs of tracks 22, 23 of the constant velocity joint 11 are designed such that a first mean opening angle increase S1 of the opening angle δ over the articulation angle β within the first articulation angle range β1 is greater than a second mean opening angle increase S2 within the second articulation angle range β2. More details on the opening angles are described below in connection with FIG. 3.

FIG. 1D) to 1G) show further details of the track shape of the outer ball tracks 22 of the outer joint part 12 and the inner ball tracks 23 of the inner joint part 13.

It can be seen that the attachment-sided track sections 22a of the outer joint part 12 each have two segments 22a1, 22a2. A first segment 22a1 of the attachment-sided track sections 22a of the outer joint part 12 extends from the joint center plane EM over a track angle (β/2 of 10°, which corresponds to a joint articulation angle of 20°. The first attachment-sided track segment 22a1 has a first radius of curvature Ra1 around a first segment center Ma1. The radius of curvature Ra1 is smaller than the pitch circle radius PCR, wherein the ratio of the pitch circle radius PCR to the first radius of curvature Ra1 can be in particular greater than 1.4. The first segment center Ma1 is located in the joint center plane EM and has a radial offset Or1 from the longitudinal axis L12 in direction towards the associated ball track 22. The first track segment 22a1 extends over a first track segment angle γ1 around the first segment center Ma1, wherein the track segment angle γ1 can be in particular between 14° and 22°.

The first track segment 22a1 is continuously adjoined by a second track segment 22a2. The attachment-sided track segments 22a2 of the outer joint part 12 have a second radius of curvature Ra2 around a second segment center Ma2. The second radius of curvature Ra2 is larger than the first radius of curvature Ra1, wherein the ratio of the pitch circle radius PCR to the second radius of curvature Ra2 of the attachment-sided track segment 22a can be smaller than 1.4. The segment center Ma2 of the attachment-sided second track segment 22a2 lies on the longitudinal axis L12 and is axially offset from the joint center M by an axial offset O2a in direction towards the opening side, wherein other configurations with radial offset of the circle center Ma are also conceivable. The second track segment 22a2 extends over a second track segment angle γ2 around the second segment center Ma2, which can be in particular between 12° and 20°. As can be seen in FIGS. 1E) and 1G), the ball tracks 23 of the inner joint part 13 are correspondingly reversely designed.

The ball tracks 22, 23 of the present constant velocity joint therefore have a total of two changes in curvature, without being restricted thereto. In this context, a change of curvature means any change in the gradient of the center point line A, A' in a mathematical sense.

A first curvature change point P1 is formed between the opening side track section 22o and the attachment side track section 22a. The curvature change point P1 is located in the joint center plane EM. A tangent running through the curvature change point P1 is parallel to the longitudinal axis L12. The opening-sided section 22o is formed by a straight line parallel to the longitudinal axis L12, without being restricted thereto; it is also conceivable that the opening-sided section could be formed by a circular arc or a curve of higher order. The second curvature change point P2 is formed between the first and second attachment-sided track segments 22a1, 22a2.

The inner joint part 13 of the constant velocity joint 11 has a ball center point line A', which is complementary to the ball center point line A of the outer joint part 12. This means that the ball center point line A' of the inner joint part 13 is mirror-symmetrical to the ball center point line A of the outer joint part 12 in relation to the joint center plane EM, respectively in relation to the angle bisecting plane between the longitudinal axis L12 of the outer joint part 12 and the longitudinal axis L13 of the inner joint part 13. In order to avoid repetition, it is thus referred to the explanations given in connection with the description of the ball tracks 22 of the outer joint part 12 with regard to the course of the ball center point lines A' of the inner joint part 13.

FIGS. 2A) to 2C) show the constant velocity joint 11 in different angular positions, FIG. 2A) with coaxially aligned outer joint part 12 and inner joint part 13, i.e. articulation angle β=0°, FIG. 2B) with an articulation angle of 20° and FIG. 2C) with an articulation angle of 40°. Different articulation angles of the joint result in different opening angles. The opening angles δ are each enclosed by an outer contact line tangent T applied to the outer contact line K on the respective ball 14 and an inner contact line tangent T' applied to the inner contact line K' of said ball 14.

It can be seen in FIG. 2A) that an outer central contact line tangent T applied to the outer contact line K at the articulation angle β of zero degrees and an inner central contact line tangent T' applied to the inner contact line K' run parallel to each other, i.e. when the joint is aligned, the opening angle δ is zero degrees. However, it is also possible that the opening angle δ is greater than zero when the joint is aligned, for example between zero and eight degrees. Due to a small opening angle δ0 when the joint is aligned, only small axial forces act from the ball tracks 22, 23 on the balls 14, which reduces friction for the joint.

Furthermore, it can be seen in FIGS. 2B) and 2C) that the outer and inner ball tracks 22, 23 are designed such that in the joint articulation plane, both, at the ball 14o (lower half of the Figure) which starting from the joint center plane EM moves towards the opening side, as well as at the ball 14a (upper half of the Figure) which starting from the joint center plane EM moves towards the attachment side, opening angles δ are generated that open in the same axial direction. This means that the resulting axial forces acting by the opening angles δ from the ball tracks 22, 23 on the balls 14 thus act in the same axial direction.

A first articulation angle range is here defined as comprising articulation angles of up to plus minus twenty degrees (β=0° ±20°) around the joint center plane EM, i.e. an articulation angle range β1 from −20° to +20° (−20° <β1 <20°). An adjoining second articulation angle range β2 includes articulation angles β that are greater than 20 degrees regarding the absolute value, i.e., articulation angles β that are greater than 20° and those that are less than −20° (β<−20° or β>20°).

For an articulation angle β of 20° (FIG. 2B), at the ball 14o moving in the joint articulation plane towards the opening side a first opening angle δ20o is formed between the outer tangent T20o and the inner tangent T20o', which in the present embodiment is in particular about 20°, while at the ball 14a moving in the joint articulation plane towards the attachment side a second opening angle δ0a is formed between the outer tangent T20a and the inner tangent T20a', which in particular is about 10°.

With a larger articulation angle β of 40° (FIG. 2C), the opening angles δ40o, δ40a on the opening-sided and attachment-sided ball 14o, 14a are each larger in the present embodiment than with the articulation angle of 20°. In particular, the opening angle δ40o on the opening-sided ball 14o is about 40°, while the opening angle δ40a on the attachment-sided ball 14a is about 20°.

It is to be understood that the mentioned opening angles δ for the mentioned articulation angles β are exemplary and depend on the selected track form.

Below, possible configurations of the pairs of tracks 22, 23 are explained using the diagram according to FIG. 3, which shows the opening angle δ (in angular degrees) over the articulation angle β (in angular degrees). Herein, the opening angles δ for the balls 14, which move towards the attachment side of the outer joint part 12 when the joint is angled, are indicated on the negative articulation angles β. Accordingly, the opening angles δ for the balls 14, which move to the opening side of the outer joint part 12 when the joint is angled, are indicated on the positive articulation angles β. The lower dotted line in the angular range for the articulation angle β between zero and 50° essentially reflects the configuration of the pairs of tracks according to FIGS. 1 to 2. The upper dotted line for the articulation angle β between zero and 50° represents an exemplary upper limit line for courses of opening angles δ. Between the lower and upper dotted line, a further exemplary configuration is shown with a solid line for the balls 14, which upon angulation of the joint move towards the attachment side of the outer joint part 12.

Common to all illustrations is that the opening angle δ is zero (δ=0°) when the joint is aligned (β=0°). For the pairs of tracks according to the lower dotted line, the first mean opening angle increase S1 for the first attachment-sided track segment 22a1, 23a1 equals 0.5, i.e. with an articulation angle β=−10° the opening angle δ amounts to 5° and with an articulation angle β=−20° the opening angle δ amounts to 10°. The opening angle δ can increase by at least ten degrees within the first attachment-sided track segment 22a1, 23a1 (δ20−δ0≥10°). In the second attachment-sided track segment 22a1, 23a1, i.e. from an articulation angle greater than 20°, the opening angle δ remains constant at 10° in the lower dotted configuration, i.e. the increase of the opening angle S2 is zero.

Any other configuration of the attachment-sided sections 22a, 23a of the pairs of tracks 22, 23 is conceivable, resulting in a course of the opening angle δ over the articulation angle β between the two dotted lines. For example, the first mean opening angle increase S1 for articulation angles of, regarding the absolute value, up to 15° within the first attachment-sided track segment 22a1, 23a1 can be 2.0, i.e., with an articulation angle β=−10° the opening angle β is 20° and with an articulation angle β=−15° the opening angle δ is 30° (upper dotted line). In the second attachment-sided track segment 22a1, 23a1, the opening angle δ can increase further, but with a lower gradient rate S2 of, for example, less than 0.5.

The opening side sections 22o, 23o of the pairs of tracks 22, 23 are configured in the present embodiment such that the opening angle δ constantly increases with increasing articulation angle β of the joint. This means that with an articulation angle β=10°, the opening angle δ is 10°, with an articulation angle β=20°, the opening angle δ is 20°, and so on (dotted line). This configuration results in that for each articulation angle β within the first articulation angle range, an opening-sided opening angle δo of a ball 14 moving in the joint articulation plane EB to the opening side of the outer joint part 12 and an attachment-sided opening angle δa of a ball 14 moving at the same articulation angle β in the joint articulation plane EB to the attachment side of the outer joint part 12 open in the same axial direction.

The overall result for constant velocity joints is that the opening angle δ increases relatively sharply within the central articulation angle range of up to twenty degrees around the joint center plane EM, so that a reliable cage control of ball cage 15 is ensured here. However, because the increase in the opening angle δ decreases again at larger articulation angles β of more than twenty degrees, and is in particular smaller than in the central articulation angle range, the balls 14 remain reliably guided in the inner joint part 13 even at these large articulation angles β and exit only slightly axially from the ball tracks 23 of the inner joint part 13.

LIST OF REFERENCE SIGNS 11 constant velocity joint
12 outer joint part
13 inner joint section
14 ball
15 ball cage
16 outer spherical face
17 inner spherical face
18 window
19 attachment side
20 opening side
21 opening
22 outer ball track
22a, 22o track sections
23 inner ball track
23a, 23o track sections
24 journal
25 drive shaft
A, A' center point line
Aa, Ao center point lines
R radius
M joint center
EM joint center plane
T, T' tangent
β joint articulation angle
δ opening angle

The invention claimed is:

1. Constant velocity joint, comprising:
an outer joint part with an outer part longitudinal axis and outer ball tracks, wherein the outer joint part has an attachment side and an opening side,
an inner joint part with an inner part longitudinal axis and inner ball tracks, wherein respectively an outer ball track and an inner ball track form a pair of tracks with each other,
a torque-transmitting ball in each pair of tracks,
a ball cage which is arranged between the outer joint part and the inner part and comprises circumferentially distributed cage windows which each receive at least one of the torque-transmitting balls,
wherein the balls define a joint center plane by the ball cage when the inner part longitudinal axis and the outer part longitudinal axis are coaxially aligned, wherein the inner part longitudinal axis and the outer part longitudinal axis define a joint articulation plane at articulation angles other than zero degrees;
wherein, viewed in the joint articulation plane, in any angular position of the constant velocity joint, an opening angle is formed between an outer tangent, which is applied to the outer ball track in an outer contact point between the outer ball track and the ball, and an inner tangent, which is applied to the inner ball track in an inner contact point between the inner ball track and the ball,
wherein the centers of the balls each define a center point line when moving along the pair of tracks,
wherein, furthermore, a first articulation angle range is defined comprising articulation angles less than twenty degrees ($-20°<β<20°$), and wherein a second articulation angle range is defined comprising articulation angles greater than twenty degrees ($β<-20°$ and $β>20°$),
wherein at least some of the pairs of tracks are configured such that:
an attachment-sided opening angle of a ball moving in the joint articulation plane towards the attachment side of the outer joint part increases within the first articulation angle range with increasing an articulation angle, wherein an attachment-sided first mean opening angle increase of the attachment-sided opening angle is defined over the articulation angle within the first articulation angle range,
wherein the attachment-sided first mean opening angle increase of the first articulation angle range is greater than an attachment-sided second mean opening angle increase of the second articulation angle range.

2. The constant velocity joint according to claim 1,
wherein the attachment-sided first mean opening angle increase is greater than 0.5, and
wherein the attachment-sided second mean opening angle increase is less than 0.5.

3. The constant velocity joint according to claim 1,
wherein the at least some of the pairs of tracks are configured such that:
at an articulation angle of zero degrees the opening angle is at least zero degrees and less than eight degrees.

4. The constant velocity joint according to claim 1,
wherein the at least some of the pairs of tracks are configured such that the attachment-sided opening angle is variable over the articulation angle within the second articulation angle range.

5. The constant velocity joint according to claim 1,
wherein the at least some of the pairs of tracks are configured such that, for any articulation angle within the second articulation angle range, an opening-sided opening angle of a ball moving in the joint articulation plane towards the opening side of the outer joint part and an attachment-sided opening angle of a ball moving at the same articulation angle in the joint articulation plane towards the attachment side of the outer joint part open in the same axial direction.

6. The constant velocity joint according to claim 1,
wherein the outer ball tracks each comprise, over a length thereof, an opening-sided track section and an attachment-sided track section,
wherein the attachment-sided track sections of the outer ball tracks each have at least two segments with different curvature.

7. The constant velocity joint according to claim 6,
wherein a first segment of the attachment-sided track sections of the outer joint part has a first radius of curvature,
wherein a ratio of a pitch circle radius to the first radius of curvature of the attachment-sided track section is greater than 1.4.

8. The constant velocity joint according to claim 7,
wherein the first radius of curvature of the first segment is formed by a first circular arc section around a first segment center, wherein the first segment center is arranged in the joint center plane and comprises a radial offset from the longitudinal axis in direction towards the ball track.

9. The constant velocity joint according to claim 8,
wherein a second segment of the attachment-sided track sections of the outer joint part has a second radius of curvature,
wherein the ratio of the pitch circle radius to the second radius of curvature of the attachment-sided track section is smaller than 1.4.

10. The constant velocity joint according to claim 9,
wherein the second radius of curvature of the second segment is formed by a second circular arc section around a second segment center, wherein the second segment center comprises an axial offset from the joint center plane in direction towards the opening side.

11. The constant velocity joint according to claim 10, wherein the at least some pairs of tracks are configured such that the first circular arc section extends over a first track segment angle of 14° to 22° around the first segment center, and the second circular arc section extends over a second track segment angle of 12° to 20° around the second segment center.

12. The constant velocity joint according to claim 1, wherein the ball cage has a spherical outer face for guiding the ball cage with respect to an inner face of the outer joint part and a spherical inner face for guiding the ball cage with respect to an outer face of the inner joint part, wherein an axial offset is provided between a center of the spherical outer face and a center of the spherical inner face.

13. The constant velocity joint according to claim 1, wherein a lubricant is provided for lubricating the constant velocity joint, wherein the lubricant has a coefficient of friction between 0.02 and 0.09.

14. The constant velocity joint according to claim 1, wherein at least one of the following applies to the at least some of the pairs of tracks:

a ratio between a pitch circle radius and a ball diameter is between 1.4 and 2.1;

a ratio between a pitch circle radius and an axial offset of the ball cage is between 5.0 and 12.5;

a ratio between a pitch circle radius and an axial offset of the second track segment center is between 4.0 and 8.0;

a ratio between a pitch circle radius and a diameter of a connecting profile of the inner joint part is between 1.0 and 1.25;

a ratio between a pitch circle radius and an outer diameter of the outer joint part is between 0.315 and 0.345.

* * * * *